Figure 3:
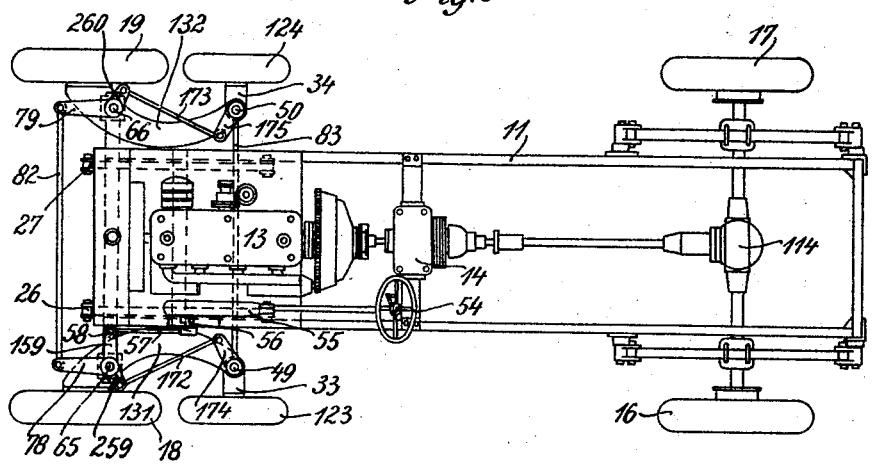

Nov. 29, 1932.  A. FLETTNER  1,889,728
STEERING GEAR FOR VEHICLES
Filed June 27, 1929  2 Sheets-Sheet 1
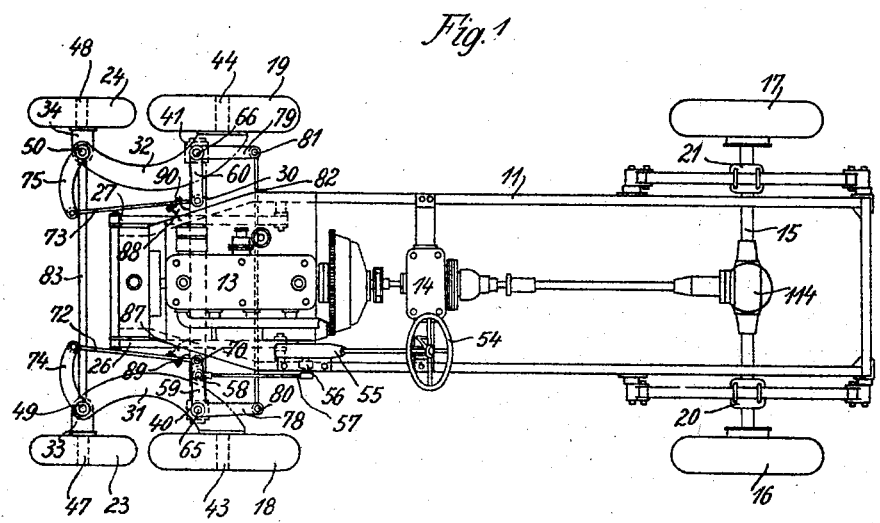
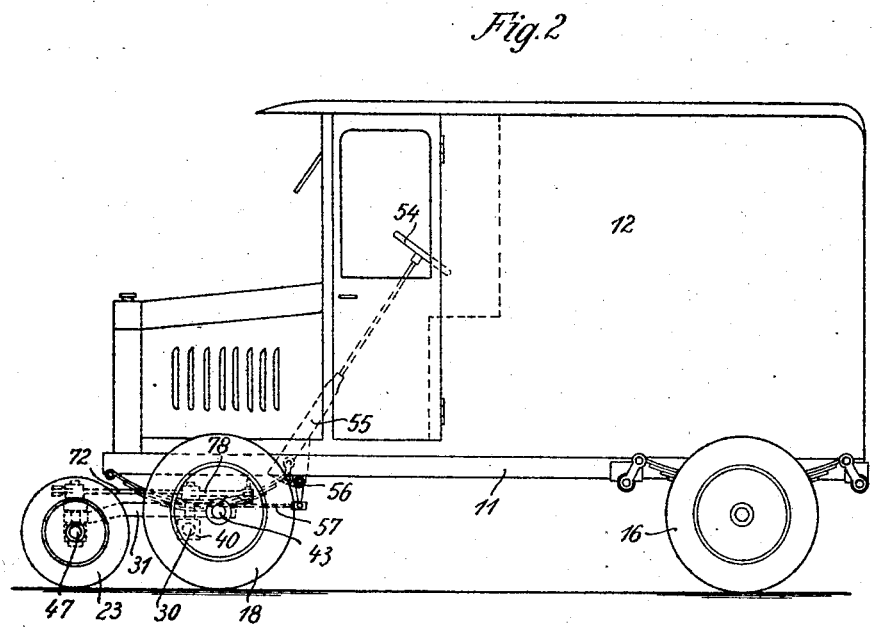
Inventor:
Anton Flettner,
by Emery, Booth, Varney & Townsend
Attys.

Nov. 29, 1932.　　　A. FLETTNER　　　1,889,728
STEERING GEAR FOR VEHICLES
Filed June 27, 1929　　　2 Sheets-Sheet 2

Inventor:
Anton Flettner,
by Emery, Booth, Varney & Townsend
Attys.

Patented Nov. 29, 1932

1,889,728

UNITED STATES PATENT OFFICE

ANTON FLETTNER, OF BERLIN, GERMANY

STEERING GEAR FOR VEHICLES

Application filed June 27, 1929, Serial No. 374,247, and in Germany July 5, 1928.

My invention relates to improvements in steering gear for vehicles, more particularly automotive vehicles.

The main object of my invention is to provide mechanism by means of which vehicles may be steered far more easily and quicker than is possible with the mechanism heretofore employed for the purpose.

According to my invention the angularly oscillatable main wheels of an automotive vehicle are not directly steered by the hand of the driver through a steering gear, but one or a plurality of auxiliary wheels are provided which partake in the support of the vehicle and which are controlled directly by the driver with the aid of suitable steering gear. These auxiliary wheels are connected with the main wheels in such manner that on the auxiliary wheels being angularly deflected by the steering gear handled by the driver, they will cause an angular deflection of the main wheels. In other words, it is not the steering gear operated by the driver that directly deflects the main wheels, but the auxiliary wheel or wheels will steer the main wheels.

In a preferred embodiment of my invention each main wheel is arranged for rotation at one end, preferably the end of the shorter arm, of a double-armed steering member mounted on some part of the vehicle frame for oscillation about a substantially vertical axis. An auxiliary wheel is oscillatably mounted at the other end of one or each steering member and steering gear extending from the driver's seat to the auxiliary wheel or wheels is connected with these wheels in such manner that by operating the steering gear the auxiliary wheel or wheels can be angularly deflected. Obviously the deflection of a wheel or wheels carrying only a comparatively small, if any, part of the weight of the vehicle can be effected far more easily and quickly than that of a pair of main wheels loaded with about one-half of the total weight of the vehicle. By virtue of their being operatively connected with the main wheels by the oscillatable steering members, the auxiliary wheels will transmit their movement of angular deflection on these steering members, whereby the main wheels are similarly deflected.

Preferably the connection between the wheels is such that accidental deviations of the main wheels are automatically redressed by the auxiliary wheels.

In the drawings affixed to and forming part of this specification three embodiments of my invention are illustrated diagrammatically by way of example, but it will be readily understood that my invention is by no means confined to the examples illustrated and described, and that any arrangement utilizing the broad underlying principle of my invention falls within the ambit of my claims.

In the drawings

Figure 4:
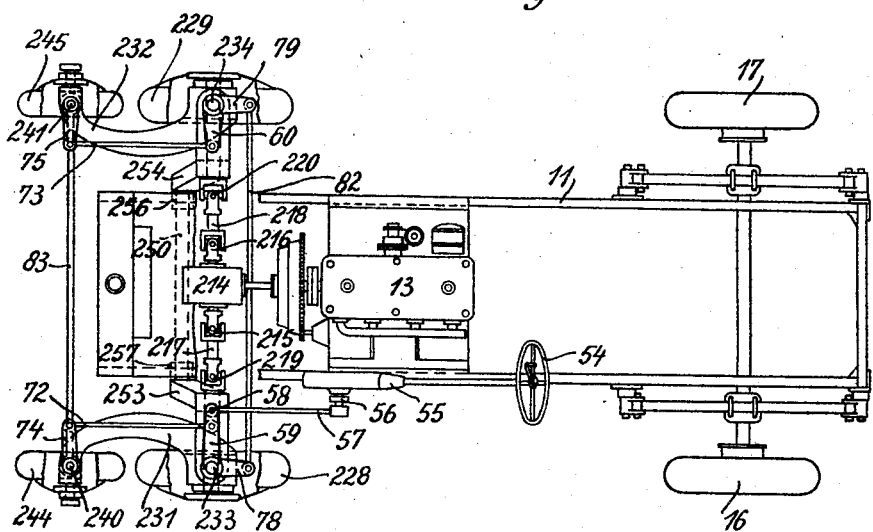

Fig. 1 is a plan of the chassis of an automotive vehicle in which two main wheels are steered by two auxiliary wheels located in front of the main wheels, while Fig. 2 is a side-elevation of the vehicle, Fig. 3 is a plan view of the chassis of a modified form of vehicle in which the auxiliary wheels are located behind the main wheels steered by them, and Fig. 4 is a similar view of a third modification.

Like parts are indicated by like numerals of reference throughout all the figures of the drawings.

Referring to Figs. 1 and 2 of the drawings, 11 is the chassis or underframe of an automotive vehicle, 12 the coachwork of the car, 13 the motor, 14 and 114 the gear which transmits power from the engine to the rear axle 15. 16 and 17 are the rear wheels. The angularly oscillatable front main wheels are marked 18 and 19. 23 and 24 are two auxiliary wheels.

The weight of the car rests at 20, 21 on the rear frame of the vehicle and is supported by the axle 30 in such a manner that the point of support of that part of the weight of the car which is apportioned to the front wheels is nearer the center of the main wheels 18, 19 than the center of the auxiliary wheels 23, 24, so that the latter wheels are called upon to carry only a small portion of the weight of the car. The axle 30 carries in its turn steering members 31, 32, each of which in the example illustrated is formed in one piece, but may also consist of a plurality of articulated pieces. The steering members are arranged for vertical oscillation about this axle with sleeves 40, 41 and for horizontal oscillation about pins 65, 66 mounted on these sleeves. On the short arms of the steering members are mounted the main wheels 18, 19, their axles 43, 44 being fixed to the ends of the steering members, while the auxiliary wheels are pivoted to the ends of the longer arms of those members by means of the stump axles 33, 34, so that the auxiliary wheels can oscillate with their stump axles 47, 48 about the vertical pins 49 and 50 mounted on the steering members of the connecting point.

The steering gear consists of a suitable steering mechanism, for instance the steering wheel 54, which in the conventional manner, for instance, a worm and wormwheel 55, 56 acts upon the rod 57, which by means of a pin 58 engages an auxiliary steering lever 59, which is oscillatably mounted on the pin 65 forming the pivot for the steering member 31. By a pin 70 on the lever 59 is engaged another rod 72 which in turn engages the main steering lever 74. The steering lever is mounted for oscillation on the pin 49 fixed to the end of the steering lever and is rigidly fixed to the stump axle 33 of the auxiliary wheel 23. To the parts 59, 72, 74 correspond similar steering gear parts 60, 73, 75 at the other side of the car. Arms 78, 79 forming bell-crank levers with the levers 59 and 60 respectively are pivotally connected at 80, 81 by a rod 82, while another rod 83 pivotally connects the ends of the steering members by means of the pins 49, 50. If by means of the steering gear 54, 55, 56, 57, 58, 72, 74 the auxiliary wheel 23 is deflected, the steering wheel 24 at the other side is similarly deflected by means of the connecting gear 78, 82, 79 and steering levers 60, 75. If the vehicle is in motion, the deflection of the auxiliary wheels 23, 24 will bring about the steering of the main wheels 18, 19 by causing the steering members 31, 32 to oscillate about their vertical pivots 65, 66, whereby the main steering wheels are also angularly displaced relative to the vehicle frame and steer the vehicle in the usual manner. In the normal position the vertical pivots 65, 66, 49, 50 are located on the corners of a rectangle and when displaced will form a parallelogram, so that the steering members at both sides of the vehicle are always turned in the same direction and to the same extent.

In order to limit an accidental deviation of the main wheels and steering levers stops 87, 88 are provided at suitable points, for instance on the axle 30, which limit the deflection of the connecting frames 31, 32. The stops are preferably made elastic by providing, for instance, resilient cushions 89, 90 of rubber, leather, springs or the like.

The mechanism illustrated is not only suitable for adjusting the main wheels, but it will also serve to correct any accidental and undesirable movement of the main wheels and to return them into the desired position by the very deflection of the auxiliary wheels resulting from such accidental movement of a main wheel. In case of such an accidental deflection of a main wheel, for instance on slippery ground, during which, for instance, the auxiliary steering lever 59 and the main steering lever 74 are arrested in their normal position by self-locking gears 55, 56, inserted in the steering gear, the steering member 31 may be swung around the pin 65, whereby the pin 49 on the other end of the steering member, which engages the inner end of the main steering lever 74 and the stump axle 47 of the auxiliary wheel 23, will describe part of a circle. However, as the outer end of the main steering lever 74 is fixed in position by the locked steering gear, the auxiliary wheel, while changing its angular position relative to the steering member 31, is not deflected relative to the vehicle frame and the direction of travel, but is merely displaced sideways in parallel to its former position and, being in positive steering connection with the main wheel, will cause the steering member 31 to swing back into normal position, carrying the main wheel with it, without the driver being required to operate the steering gear. Obviously this correction of an accidental deflection of the main wheels will take place in any position, even in the steering positions of the main wheels.

The degree of correction may be predetermined by a suitable choice of the leverage or transmission ratio. If, for instance, the auxiliary steering lever 59 is made longer than the main steering lever 74, a considerable corrective effect is obtained. If the main steering lever 74 is made longer than lever 59, the effect of the correction is less. As a rule the lever 74 will be made longer than the lever 59, because then favorable steering conditions result and in particular less power is required for steering. It will be obvious that the position of the levers 74, 75, which is adjusted from the driver's place, determines the position which the main wheel should assume and which it retains also under the influence of the corrective motion, even in the case of disturbances caused by the track.

The pivots of the auxiliary steering levers 59 and 60 are preferably made to coincide with the axes of oscillation, of the steering members 31, 32, because the control as well as the correction action is thus rendered simple and may easily be determined in advance for all positions.

In the modification of my invention illustrated in Fig. 3 of the drawings the auxiliary wheels 123, 124 are located to the rear of the main wheels 18, 19. In principle the arrangement is, however, the same as described with reference to Figs. 1 and 2 of the drawings. A difference exists in so far as the longer arms of the steering members 131, 132 now extend rearwardly and the auxiliary steering lever 159 has an outer extension 259 beyond its pivot point. The lever arms 259, 174 and 260, 175, respectively, which are connected by rods 172, 173, now turn in opposite directions. This is necessary in order to obtain the correct correction effect, as otherwise due to the arrangement of the auxiliary wheels to the rear of the main wheels the turning of these levers in the same direction would result in a negative correction increasing, instead of redressing, the unintentional deflection of the main wheel.

Fig. 4 of the drawings illustrates a further modification in which the engine 13 acts through the differential gear 214, the Cardan joints 215, 216, the front wheel axles 217 and 218 and Cardan joints 219, 220 on the front main wheels 228, 229. The pivots 233, 234 of the steering members 231, 232 are located in the center of the main wheels 228, 229. The vertical pivots 240, 241 of the auxiliary wheels 244, 245 carried by the steering members 231, 232 are likewise located in the center of the auxiliary wheels. Otherwise the arrangement is the same as described above. The weight of the front portion of the car rests here on the fixed transverse axle 250 by means of oblique connecting pieces 253, 254, which are mounted on bearings 256, 257 of the fixed axle 250.—In this way a part of the load of the car is transferred onto the auxiliary wheels. The steering mechanism corresponds otherwise with the one described before and operates in the same manner.

In the embodiments described by way of example the number of auxiliary wheels corresponds to the number of dirigible main wheels, but a lesser or greater number of auxiliary wheels may be provided. It is furthermore not necessary that the auxiliary wheels should have the same gauge as the main wheels, or that the front wheels should be steered, as the rear wheels might equally well be dirigible and governed by the auxiliary wheels. Other modifications will suggest themselves to those skilled in the art.

Various modifications and changes may be made without departing from the spirit and scope of the invention, and I desire, therefore, that only such limitations shall be placed thereon as are imposed by the prior art.

I claim as my invention:

1. Automotive vehicle comprising a vehicle main frame, a main wheel oscillatable about substantially vertical axis relative to said frame, a steering member oscillatable about the same vertical axis as said main wheel and forming a double-armed lever having arms of different length, an auxiliary wheel oscillatably mounted near the end of the longer arm of said steering member and hand steering gear operatively connected with said auxiliary wheel.

2. Automotive vehicle comprising a vehicle frame, a steering member mounted on said frame for oscillation about a substantially vertical axis, a main wheel rotatable about a horizontal axis at one end of said steering member, a main steering lever oscillatably mounted near the other end of said steering member, an auxiliary wheel rotatable about a horizontal axis at one end of said steering lever and hand steering gear connected to the other end of said steering lever.

3. Automotive vehicle comprising a vehicle frame, a steering member mounted on said frame for oscillation about a substantially vertical axis, a main wheel rotatable about a horizontal axis at one end of said steering member, a main steering lever oscillatably mounted near the other end of said steering member, an auxiliary wheel rotatable about a horizontal axis at one end of said steering lever, an auxiliary steering lever oscillatable about the axis of oscillation of said steering member and hand steering gear connected to said steering levers.

4. Automotive vehicle comprising a vehicle frame, a steering member mounted on said frame for oscillation about a substantially vertical axis, a main wheel rotatable about a horizontal axis at one end of said steering member, a main steering lever oscillatably mounted near the other end of said steering member, an auxiliary wheel rotatable about a horizontal axis at one end of said steering lever, an auxiliary steering lever oscillatable about the axis of oscillation of said steering member and hand steering gear connected to said steering levers, the operative length of said main steering lever being greater than that of said auxiliary steering lever.

5. Automotive vehicle comprising a vehicle frame, a steering member mounted on said frame for oscillation about a substantially vertical axis, a main wheel rotatable about a horizontal axis at one end of said steering member, a main steering lever oscillatably mounted near the other end of said steering member, an auxiliary wheel rotatable about a horizontal axis at one end of said steering lever, an auxiliary steering lever oscillatable about the axis of oscillation of said steering member and hand steering gear connecting said steering levers so as to keep said levers in parallel throughout the steering operations.

6. Automotive vehicle comprising a vehicle frame, two steering members, one on each side of said frame, mounted for oscillation about substantially vertical axes, a main wheel rotatable about a horizontal axis at one end of each steering member, an auxiliary wheel oscillatably mounted near the other end of each of said steering members, hand steering gear operatively connected with one of said auxiliary wheels and a connection between said auxiliary wheels.

7. Automotive vehicle comprising a vehicle frame, two steering members, one on each side of said frame, mounted for oscillation about substantially vertical axes, a main wheel rotatable about a horizontal axis at one end of each steering member, a main steering lever oscillatably mounted near the other end of each steering member, an auxiliary wheel rotatable about a horizontal axis at one end of each main steering lever, an auxiliary steering lever oscillatable about the axis of oscillation of each steering member and hand steering gear connected to said steering levers.

8. Automotive vehicle comprising a vehicle frame, two steering members, one on each side of said frame, mounted for oscillation about substantially vertical axes, a main wheel rotatable about a horizontal axis at one end of each steering member, a main steering lever oscillatably mounted near the other end of each steering member, an auxiliary wheel rotatable about a horizontal axis at one end of each main steering lever, an auxiliary steering lever oscillatable about the axis of oscillation of each steering member and hand steering gear connected to said steering levers, the main and auxiliary levers on the same side of the frame extending in opposite directions.

9. Automotive vehicle comprising a main vehicle frame, two steering members one on each side of said frame, mounted for oscillation about substantially vertical axes, a main wheel rotatable about a horizontal axis at one end of each steering member, an auxiliary wheel oscillatably mounted near the other end of each of said steering members and carrying part of the weight of said main frame, hand steering gear operatively connected with one of said auxiliary wheels and a connection between said auxiliary wheels.

In testimony whereof I affix my signature.

ANTON FLETTNER.

CERTIFICATE OF CORRECTION.

Patent No. 1,889,728.  November 29, 1932.

ANTON FLETTNER.

It is hereby certified that error appears in the printed specification of the above numbered patent requiring correction as follows: Page 1, line 7, for "mechanism" read "mechanisms"; page 2, line 17, before "mounted" insert the word "respectively"; and lines 17 and 18, strike out the words "of the connecting point"; line 29, before "steering" second occurrence, insert the word "main"; line 34, strike out the words "steering gear"; and line 60, for "deviation" read "deflection"; page 3, line 62, claim 1, after "about" insert the article "a"; and that the said Letters Patent should be read with these corrections therein that the same may conform to the record of the case in the Patent Office.

Signed and sealed this 24th day of January A. D. 1933.

M. J. Moore,
Acting Commissioner of Patents.

(Seal)